United States Patent Office 3,407,213
Patented Oct. 22, 1968

3,407,213
THIASELENOLODITHIOLE COMPOUND

Erwin Klingsberg, Mountainside, N.J., assignor to American Cyanamid Company, Stamford, Conn., a corporation of Maine
No Drawing. Filed June 10, 1966, Ser. No. 556,551
1 Claim. (Cl. 260—327)

ABSTRACT OF THE DISCLOSURE 2,4-diphenyl-[1,2]thiaselenolo[5,1-b][1,2] - dithiole is prepared by refluxing 3,5-epidithio-2,5-diphenyl-2,4-pentadienal with $P_2Se_5$ in a solvent having a boiling point above about 115° C. The compound exhibits miticidal utility.

---

This invention relates to a new organic selenium compound useful as an acaricide and to a method of making it.

The invention particularly relates to a thiaselenolodithiole, also called an epidithiopentadiene selenal and to a method of making it by reaction of the corresponding epidithiopentadienal with phosphorus selenide according to the equation:

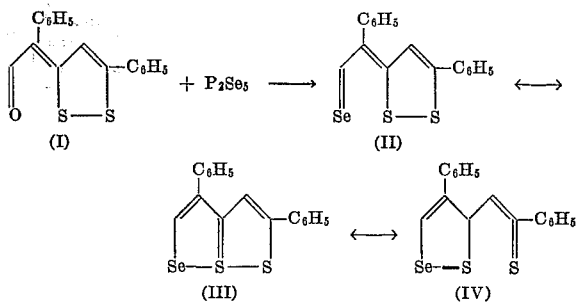

The product represented by any one of structures II, III or IV is effective in the control of mites.

The starting compound (I), i.e., 3,5-epithio-2,5-diphenyl-2,4-pentadienal, may be prepared by a method given in an article by the applicant, J.A.C.S., 85, 3244–6 (1963). According to the present invention, this compound is treated with the phosphorus selenide in a high boiling solvent, i.e., a solvent having a boiling point above about 115° C., such as o-, m- or p-xylene or chlorobenzene, at reflux temperature. The product is then isolated by evaporation and recrystallized from a low boiling non-polar solvent, having a boiling point below about 110° C., such as hexane, ethyl acetate or methylcyclohexane.

The product compound which may be represented by Formulas II, III or IV (above), named 2,4-diphenyl-[1,2]thiaselenolo[5,1-b][1,2]dithiole. When used in a concentration of 0.1% in water, it kills two-spotted spider mites.

The following example illustrates the invention.

EXAMPLE

Preparation of 2,4-diphenyl-[1,2]thiaselenolo[5,1-b][1,2]dithiole

A solution of 0.50 gram 3,5-epidithio-2,5-diphenyl-2,4-pentadienal, prepared as described in J.A.C.S. 85, 3246 (1963), in 30 ml. chlorobenzene was stirred and refluxed for three and one-half hours with 1.00 gram phosphorus selenide, $P_2Se_5$. The resulting deep purple solution was filtered and evaporated at ambient temperature giving a quantitative yield of product. Recrystallization from hexane gave deep purple crystals, M.P. 130.5–131.5° C.

I claim:
1. The compound, 2,4 - diphenyl - [1,2]thiaselenolo - [5,1-b][1,2]dithiole.

References Cited

UNITED STATES PATENTS
3,211,749    10/1965    Klingsberg.

OTHER REFERENCES

Mellor's Inorganic Chemistry: Longmans, Green and Co., New York (1939), p. 765.
Bezzi et al.: Gazz. Chim. Ital., vol. 88 (1958), pp. 1226 and 1231–1233.

JAMES A. PATTEN, *Primary Examiner.*